United States Patent [19]

Sheldon et al.

[11] Patent Number: 4,947,399
[45] Date of Patent: Aug. 7, 1990

[54] LASER MIRROR DISPLACEMENT DEVICE

[75] Inventors: John C. Sheldon, Brea; Dennis M. Hisayasu, Granada Hills, both of Calif.

[73] Assignee: Hughes Aircraft Company, Los Angeles, Calif.

[21] Appl. No.: 647,001

[22] Filed: Sep. 4, 1984

[51] Int. Cl.$^5$ .............................................. H01S 3/13
[52] U.S. Cl. ........................................ 372/29; 372/107
[58] Field of Search ............................ 372/29, 107, 20

[56] References Cited

U.S. PATENT DOCUMENTS

| | | | |
|---|---|---|---|
| 3,575,671 | 4/1971 | Dessus et al. | 372/29 |
| 3,889,207 | 6/1975 | Burgwald et al. | 372/107 |
| 4,267,478 | 5/1981 | Ljung et al. | 310/315 |
| 4,556,979 | 12/1985 | Scott et al. | 372/20 |
| 4,672,618 | 6/1987 | Wijntjes et al. | 372/20 |
| 4,691,323 | 9/1987 | Ljung et al. | 372/107 |
| 4,775,815 | 10/1988 | Heinz | 372/107 |
| 4,824,252 | 4/1989 | Lim et al. | 372/107 |

FOREIGN PATENT DOCUMENTS

| | | | |
|---|---|---|---|
| 8108954 | 11/1982 | France | 372/29 |
| 43-5348 | 3/1968 | Japan . | |
| 47-32131 | 9/1972 | Japan . | |
| 51-136863 | 11/1976 | Japan . | |
| 5572815 | 3/1978 | Japan . | |
| 59-25286 | 2/1984 | Japan . | |
| 59-39959 | 3/1984 | Japan . | |

OTHER PUBLICATIONS

McElroy et al., "Laser Tuners Using Circular Piezoelectric Benders"; *Applied Optics;* vol. 14, No. 6, Jun. 1975; pp. 1297-1302.

*Primary Examiner*—William L. Sikes
*Assistant Examiner*—Robert E. Wise
*Attorney, Agent, or Firm*—William J. Streeter; Wanda K. Denson-Low

[57] ABSTRACT

A device (10), for allowing axial displacement of an optical element (12) within a laser cavity (14), so as to control the optical path length in the cavity, includes a generally cylindrical container (16) arranged to be connected to an end of the laser cavity where the optical element is located, and a piezoelectric stack (38) mounted in the container so that the length of the stack in the axial direction can be varied by an amount corresponding to the desired optical element movement in response to an electric field applied to the stack. One end of the cylindrical container comprises a belleville shaped diaphragm (26) to which is mounted the optical element within the laser cavity. A very stiff threaded cap (20) forming the end of the cylindrical container preloads the stack and diaphragm by a prescribed torque to allow the device to perform satisfactorily when subjected to extreme environmental conditions (e.g., above 5 KHz). The stack is mounted within the cylindrical container by ball and cone joints which permit only axial forces to be applied to or from the stack, thus insuring reliable control over the degree of desired optical element movement in the cavity. the stack and electrical connections are outside of the laser cavity and do not contribute to outgassing contamination.

14 Claims, 2 Drawing Sheets

LASER MIRROR DISPLACEMENT DEVICE

The Government has rights in this invention pursuant to Contract No. F33615-83-C-2134 awarded by the Department of the Air Force.

BACKGROUND OF THE INVENTION

1. Field of the Invention

The present invention relates generally to mechanisms for controlling optical path length within a laser cavity, and particularly to a displacement device in which a PZT stack is provided in a cylindrical container outside the cavity, and a displacement member transmits axial movement of the stack relative to the container, to the optical element (e.g., a partially or fully reflective element) within the cavity.

2. Description of the Prior Art

The known systems provided for stabilizing an optical path length in a laser cavity, wherein lead zirconate titanate (PZT) elements are employed so as to maintain laser frequency stability, have been inherently vibration sensitive in at least one axis and fail to stabilize as they become unstable in the environment. Other problems arose on account of contamination of the laser vacuum area by the PZT elements themselves.

Laser stabilization systems are also known which include bimorph bending elements. Such systems, however, develop only relatively weak forces in the axial direction (i.e., the direction in which the laser mirror is desired to be displaced), so that the systems cannot withstand vibration extremes. Also, since very large forces are not developed, the known systems must be arranged so that the optical element to be stabilized (by controlled axial displacement) is mounted directly to the bending element within the laser cavity area.

SUMMARY OF THE INVENTION

An object of the invention is to overcome the above and other shortcomings in the known laser cavity stabilization systems.

Another object of the invention is to provide a displacement device in which a PZT element is employed outside the cavity vacuum, thus avoiding contamination of parts in the cavity.

Still another object of the invention is to provide a displacement device capable of providing reliably controlled axial displacement to a laser cavity optical element in response to the electrical field applied to a PZT element, wherein the device is insensitive to vibration and provides stabilization under extreme environmental conditions.

In accordance with the invention, a displacement device includes container means arranged to connect to the end of a laser cavity, at which end an optical element to be stabilized is located, and a stack of a number of piezo electric laminations mounted in the container means so that the length of the stack in the axial direction can be varied by an amount corresponding to desired controlled axial movement of the optical element. The piezo-electric stack is rigidly supported in the container means at an end further from the optical element by first mounting means, and is supported at the end closer to the optical element by second mounting means such as a stiff, preloaded diaphragm, for example, having a belleville washer shape. Axial displacement means associated with the second mounting means transmits axial movement of the stack by deflecting the diaphragm to the optical element when the length of the stack is varied in response to a change in the electric field applied to the stack excitation means.

The various features of novelty which characterize the invention are pointed out with particularity in the claims annexed to and forming a part of this disclosure. For a better understanding of the invention, its operating advantages and its specific objectives attained by its use, reference should be had to the accompanying drawings and descriptive matter in which there is illustrated and described a preferred embodiment of the invention.

DETAILED DESCRIPTION OF THE INVENTION

Figure 1:
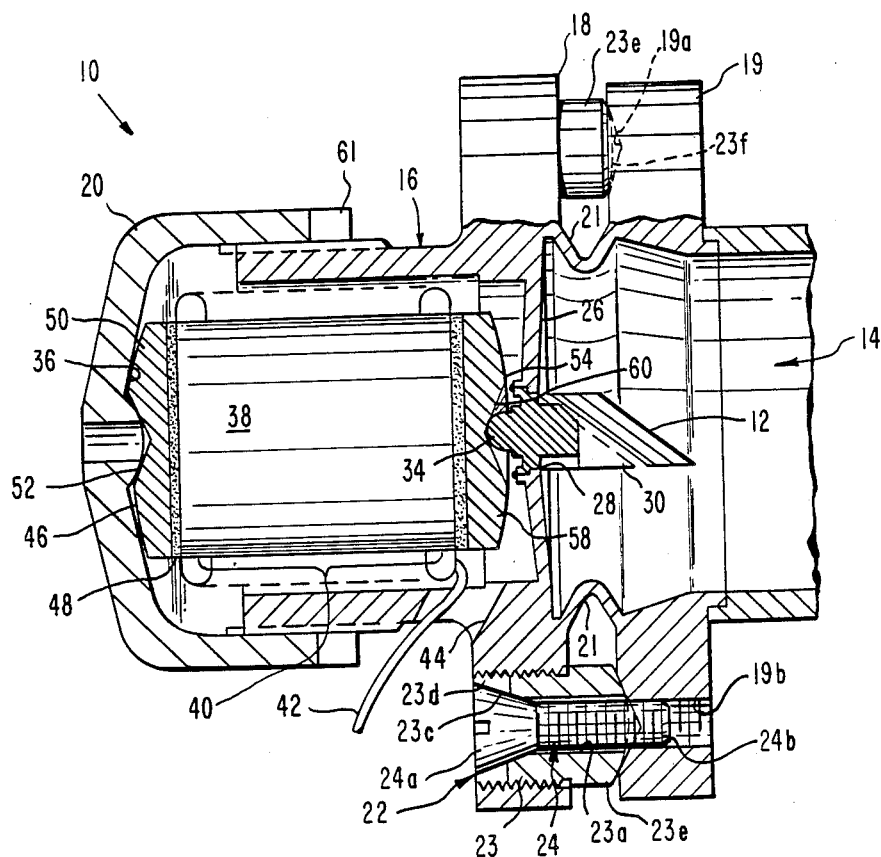
FIG. 1 is a partly sectioned elevational view of a displacement device according to the invention, shown mounted to an end of a laser cavity at which end an optical element is located.

FIG. 1 shows a displacement device 10 for providing stabilizing movement to an optical element 12 in a laser cavity 14, according to the invention. Device 10 includes a generally cylindrical container 16 having a pair of relatively movable flanges 18 and 19. Container 16 is secured to the cavity 14 adjacent to flange 19, for example, by electron beam welding. Cylindrical container 16 is covered at its opposite end by a cap 20 threaded thereto.

The relative movement between flanges 18 and 19 is provided by a flexible connecting wall 21 and a plurality of coaxial and self-locking alignment screw mechanisms 22. Each mechanism 22 includes a cylindrical adjustor screw 23 having a smooth inner bore 23a and a threaded outer periphery 23b. Outer periphery 23b threadedly engages cooperating interior threads in flange 18. Access to inner bore 23a is provided by a slotted conically configured entry 23c to form several flexible cantilevers 23d, with the slots also functioning as engagement slots for a screwdriver-type tool, so that adjustor screw 23 may be threaded into or out of flange 18. Adjustor screw 23 also includes an end 23e having a spherical end face 23f. Spherical end face 23f is adapted to contact and bear against a concave conical surface 19a on flange 19. Extending beyond surface 19a and within flange 19 is a threaded hole 19b. A locking screw 24 having a conical head 24a and a threaded shaft 24b respectively engage entry 23c of adjustor screw 23 and threaded hole 19b in flange 19. Locking screw 24, however, does not have a threaded engagement with adjustor screw 23. A hexagonal recess or the like is provided in screw head 24a to enable rotation of screw 24.

In operation, tilting adjustment between flanges 18 and 19 at a pair of diametrically opposed alignment screw mechanisms 22 is effected as follows. Locking screws 24 are positioned so that their heads 24a are spaced from conical entries 23c of their respective adjustor screws 23. The diametrically approved adjustor screws are then respectively threaded inwardly and outwardly with respect to their engagements with flange 18 and with respect to the tightened engagements between spherical end faces until the desired tilt adjustment is accomplished. To prevent disturbance of these engagements and to ensure triaxial vibrational stiffness of container 16 and its optical element 12 with respect to cavity 14, locking screws 24 are then threaded fully into flange 19 so that their heads 24a bear against entries 23a to press cantilevers 23d against the internal threads of flange 18.

The end of container 16 which is closer to cavity 14 is closed by belleville-shaped diaphragm 26 which is formed integrally within container 16, diaphragm 26 having an opening 28 through its center to permit an end of an optical element pedestal 30 to project therethrough. Diaphragm 26 tapers toward cap 20 (i.e., away from cavity 14) along the direction from the inner circumference of container 16 to the container axis. A piezoelectric stack 38 is placed between cap 20 and diaphragm 26, which is preloaded through the threaded engagement betwen the cap and container 16. Preferably, diaphragm 26 is about 0.040 inches (1 mm) thick, with a spring rate of about 65,000 pounds per inch (11,000 kg/cm). A suitable material for container 16 and diaphragm 26 is 17-4 PH stainless steel precipitated hardened material. Cap 20 is made of the same or similar material.

Pedestal 30 is hard mounted against a load bearing shoulder machined in diaphragm 26 along the edge of opening 28, pedestal 30 preferably being electron beam welded in place. The end of the pedestal which projects within container 16 forms part of a ball surface 34 which is symmetric about the axis of container 16. Another ball surface 36 is formed on the central inner surface of cap 20 and projects inwardly of the container, surface 36 also being symmetric with the container axis.

Piezoelectric stack 38, including a number of laminations 40 of piezoelectric material, is mounted in container 16 so that the planes of laminations 40 are perpendicular to the container axis, i.e., the direction along which optical element 12 is to be displaced by operation of device 10. Laminations 40 are ones which may be purchased from Physics International of San Francisco, Calif., and are of the type which expand along the container axis when a voltage or electric field is applied to them. In the present embodiment, a total of 46 laminations, each 0.015 inches (0.45 mm) in thickness, is used. Each lamination 40 is dense pack bonded by epoxy to the adjacent lamination. Further, each lamination 40 is provided with its own pair of DC voltage excitation leads, so that corresponding leads of each of the laminations are bussed to one another. A wire cable 42 is led out of container 16 through an opening 44 to enable all of the PZT laminations to be excited simultaneously by a known outside voltage applied to cable 42.

Stack 38, which is used in the present embodiment, is capable of withstanding a maximum potential of 600 volts.

The end of stack 38, which faces ball surface 36 on the inside of cap 20, has a ball and cone interface arrangement 46 including an insulating lamination 48 and a bearing plate 50 formed of 440c hardened stainless steel. Plate 50 has a conical recess 52 formed symmetrically with the axis of stack 38 for receiving ball surface 36 on cap 20. The entire interface arrangement 46 is dense pack bonded to stack 38, preferably by epoxy resin. Likewise, at the opposite axial end of stack 38, another interface arrangement 54 is provided including an insulating lamination 56 and a bearing plate 58 made of 440c hardened stainless steel, the entire interface arrangement 54 being dense pack bonded to stack 38, preferably also by expoxy resin. Further, bearing plate 58 also has a conical recess 60 formed symmetric with the axis of stack 38 for receiving ball surface 34 at the projecting end of pedestal 30. The bearing joints formed by ball surface 52 and conical recess 36, and ball surface 34 and conical recess 60, are such as to permit only substantially axial forces and movement to be transmitted to and from PZT stack 38.

To assure proper operation of device 10, it is important that stack 38 and diaphragm 26 be preloaded with an axial force applied by torquing threaded cap 20 through the ball and cone interfaces, as explained above. It has been found that a suitable range for the preload force applied to stack 38 is 150 to 250 pounds (68–105 kg), and preferably about 200 pounds (91 kg). The preload force is produced once stack 38 is loaded into container 16, and cap 20 is screwed onto the open end of container 16 so that ball surface 36 inside cap 20 engages conical recess 52 in bearing plate 50, and cap 20 is further advanced in the direction toward diaphragm 26 to cause interface arrangement 54 on stack 38 to compress against ball surface 34 on pedestal 30 which, in turn, reacts against load bearing shoulder 28 in the diaphragm. Diaphragm 26 then becomes elastically deformed so as to maintain the desired preload force on stack 38. The vibrational stiffness of the entire assembly is maintained by this preload force. The preload force also acts as a restoring force upon removal of the voltage applied to the PZT stack to enable the device to return to its original position. A lock nut 60 is then tightened against the circumferential edge of cap 20 to prevent the cap from loosening and decreasing the preload force.

A vacuum seal is maintained within cavity 14 by flexible cylindrical wall 21. With the foregoing arrangement, it will be appreciated that PZT stack 38 is maintained outside the vacuum region of cavity 14, owing to the fact that pedestal 30 is joined in an airtight manner, e.g., by electron beam welding to, diaphragm 26 which is integrally formed with cylindrical container 16.

In operation, it has been found that a voltage of between 450–500 volts applied to stack 38 produces an axial movement of 7.5–10 micrometers, which is sufficient for laser stabilization. Frequency response tests have verified that the resonant frequency of device 10 is above 5 KHz. Such stiffness will allow device 10 to perform satisfactorily when subjected to extreme environmental conditions such as might be encountered in airborne laser radar systems.

Figure 2:
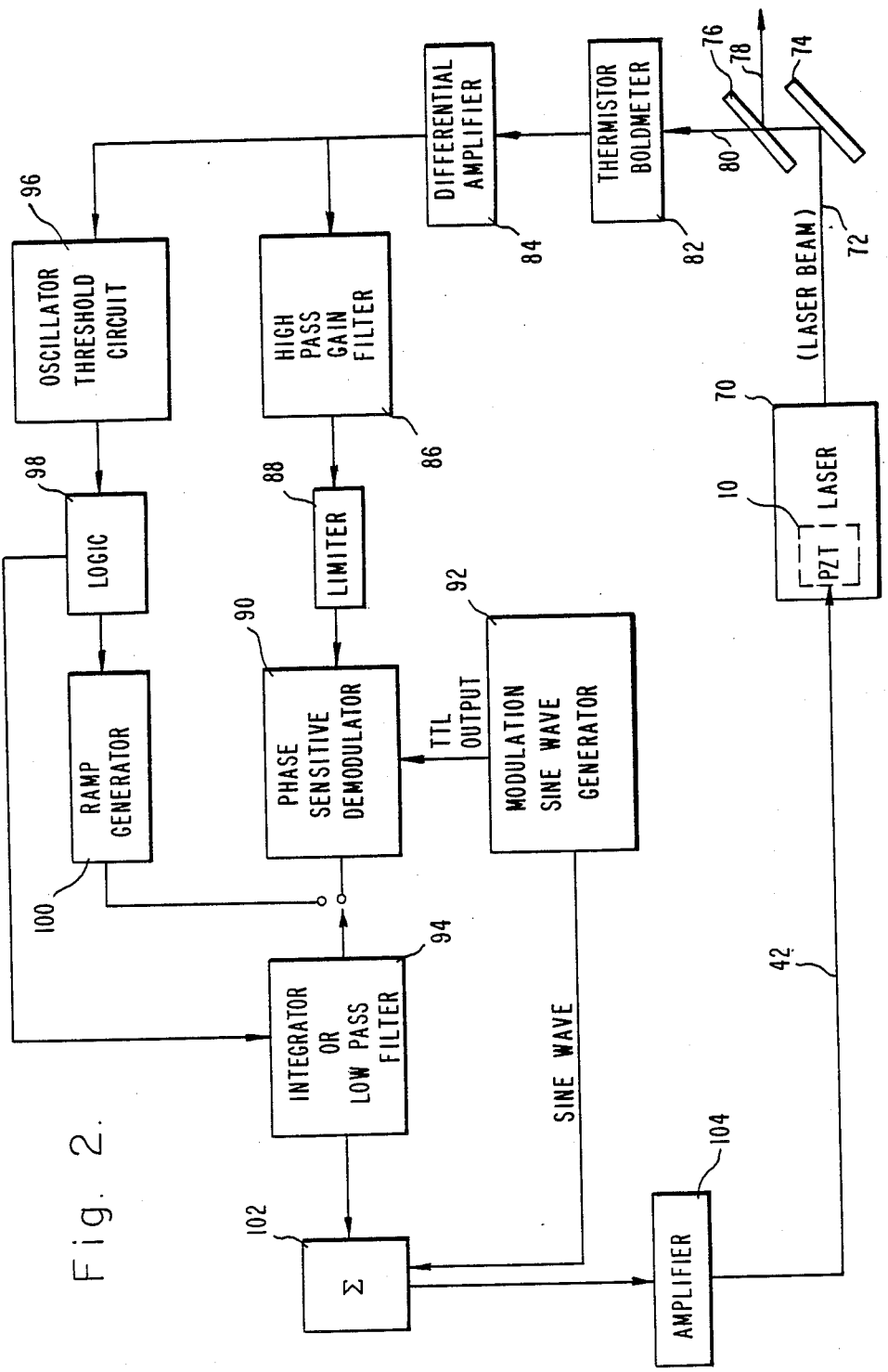
FIG. 2 is a functional block diagram of the circuit used to explain displacement control.

Proper operation of the present invention requires feedback information from operation of the laser, as will be understood in conjunction with the functional diagram depicted in FIG. 2. As illustrated, PZT device 10 is coupled to laser cavity 14 of a laser 70, having an output 72. Output 72 is directed through a fully reflecting surface 74 and to a partially reflecting mirror 76. From mirror 76, the output is split into a pair of beams 78 and 80. Beam 78 is directed to the use for which the laser is intended while beam 80 is used in the feedback loop. Beam 80 is directed to a sensor, preferably comprising a thermistor bolometer 82, having a bandwidth, for example, of greater than 50 Hz. While a thermistor bolometer is preferred, other detector sensors may be used to sense DC signals or to sense independently AC and DC signals for independent processing, if it is desired to increase the bandwidth.

In the preferred embodiment, the signal from bolometer 82 is directed to a high impedance differential amplifier 84, e.g., greater than 10 mega-ohms to produce a signal under room temperature conditions. The signal is then split into AC and DC components for further processing.

The AC component is provided by a high pass gain filter 86, which eliminates the DC component from the signal provided by amplifier 84. A limiter 88 plus offset coupled to filter 86 converts the AC component to a standard TTL (transistor-transistor logic) level between 0–5 volts. Following this conversion, a phase sensitive demodulator 90, in conjunction with an input from a modulation sine wave generator 92, outputs an error signal to command PZT device 10 to have a peak power level. This output signal is forwarded to an integrator or low pass filter 94, as conditioned by the DC component from amplifier 84.

This DC component is obtained first by passing the signal from amplifier 84 to an oscillator threshold circuit 96 and logic 98. Circuit 96 and logic 98 in effect ignore the AC component and determine the mode of operation, whether servo or scan. The servo mode causes the DC component to be frequency locked while the scan mode provides a search and acquire function for a peak power to be locked onto. During the transistion from the scan mode to the servo mode, the output of the integrator in unit 94 tracks the low pass filter output thereof to set the initial conditions. When in the scan mode, unit 94 is coupled to a ramp generator 100 and, when in the servo mode, unit 94 is coupled automatically to phase sensitive demodulator 90, and the signal from unit 94 is summed in a summation circuit 102 along with a sine wave from modulation sine wave generator 92 to form a PZT voltage signal. The PZt signal is amplified in amplifier 104, having for example a minimum power of 2 watts, and is supplied through wire cable 42 for energization of PZT stack 38 in device 10. Such energization changes the laser cavity length, as previously described, for enabling the laser output to be locked at a constant predetermined frequency at maximized power.

While the foregoing description represents a preferred embodiment of the present invention, it will be obvious to those skilled in the art that various changes and modifications may be made therein, without departing from the true spirit and scope of the invention.

What is claimed is:

1. A displacement device for uniformly moving an optical element positioned within a laser cavity and along an axis therein comprising:
   container means coupled to an end of the laser cavity and positioned exterior thereto;
   a piezoelectric stack including laminations of piezoelectric material extending generally along the axis of said stack and axially movable by an amount corresponding to a desired axial movement of said optical element;
   first and second mounting means within said container means coupled to respective ends of said stack for support thereof, said first and second mounting means being respectively closer to and further from said optical element and the cavity;
   axial displacement means associated with said second mounting means and sealing said optical element from said container means and said piezoelectric stack for enabling axial movement of said stack and transmission of the stack movement to said optical element without permitting contamination thereof; and
   excitation means for applying an electric field to said stack for varying its length.

2. A displacement device according to claim 1, wherein said piezoelectric material comprises lead zirconate titanate.

3. A displacement device according to claim 1, wherein said container means comprises a cylindrical container and a retainer cap covering said cylindrical container at its end further from said optical element.

4. A displacement device according to claim 3, wherein said retainer cap has a central inner surface which forms a part of said first mounting means.

5. A displacement device according to claim 4, wherein said central inner surface projects to form part of a ball, and said first mounting means includes electrically insulative interface means fixed at the end of said stack facing said central inner surface, said first interface means forming a conical recess for receiving said ball part to form a joint through which substantially only axial forces are transmitted.

6. A displacement device according to claim 1, wherein said second mounting means includes preloading means fixed to said cylindrical container in the vicinity of the end of said stack closer to said optical element, for applying a preload force to said stack in the axial direction toward said first mounting means.

7. A displacement device according to claim 6 in which said preloading means includes means for maintaining stiffness of said device.

8. A displacement device according to claim 6, wherein said preloading means comprises a conical diaphragm on said cylindrical container, said diaphragm tapering towards said first mounting means.

9. A displacement device according to claim 8, wherein said axial displacement means comprises a optical element pedestal one end of which is fixed to and projects through said diaphragm, said second mounting means includes electrically insulative interface means fixed at the end of said stack facing said optical element, said interface means forming a conical recess, and said one end of said optical element pedestal forms part of a ball for engaging the conical recess to form a joint through which substantially only axial forces can be transmitted.

10. A displacement device according to claim 1, comprising a pair of flanges on said cylindrical container for enabling said container means to be alignably joined to the cavity.

11. A displacement device according to claim 10, including a flexible cylindrical wall joining said flanges to form an air-tight seal therebetween.

12. A displacement device for allowing controlled uniform axial movement of an optical element in a laser cavity and for maintaining said optical element essentially free from contamination, comprising:
   means external to said cavity coupled to said optical element for applying axial movements thereto;
   means disposed between said optical element and said external means for providing a sealing coupling therebetween for maintaining said optical element essentially free from contamination external to the laser cavity; and
   means coupled to said external means for enabling operation thereof to provide the axial movement of said optical element with respect to the laser cavity in response to thermally applied axial variations therebetween.

13. A displacement device according to claim 12, further including means coupled to said adjusting means for providing a resonant frequency of said device of at least 5 KHz, generally regardless of environmental conditions.

14. A displacement device according to claim 12, in which said sealing coupling means includes means for applying a preload force to said external means and said adjusting means and for stiffening said sealing coupling means, for minimizing any effects of vibrations on the displacement device and the laser cavity from adversely affecting the operation of said external means.

* * * * *